(12) United States Patent
Schulz et al.

(10) Patent No.: US 9,463,435 B2
(45) Date of Patent: Oct. 11, 2016

(54) PROCESS FOR PRODUCING CARBON SUBSTRATES LOADED WITH METAL OXIDES AND CARBON SUBSTRATES PRODUCED IN THIS WAY

(71) Applicant: Blücher GmbH, Erkrath (DE)

(72) Inventors: Christof Schulz, Köln (DE); Hartmut Wiggers, Reken (DE)

(73) Assignee: Blücher GmbH, Erkrath (DE)

( * ) Notice: Subject to any disclaimer, the term of this patent is extended or adjusted under 35 U.S.C. 154(b) by 0 days.

(21) Appl. No.: 14/500,175

(22) Filed: Sep. 29, 2014

(65) Prior Publication Data

US 2015/0031528 A1 Jan. 29, 2015

Related U.S. Application Data

(62) Division of application No. 13/054,609, filed as application No. PCT/EP2009/005182 on Jul. 16, 2009, now Pat. No. 9,421,518.

(30) Foreign Application Priority Data

Jul. 17, 2008 (DE) .................. 10 2008 033 574

(51) Int. Cl.

| | |
|---|---|
| B01J 21/06 | (2006.01) |
| B01J 21/18 | (2006.01) |
| B01J 23/22 | (2006.01) |
| B01J 23/30 | (2006.01) |
| B01J 23/40 | (2006.01) |
| B01J 23/48 | (2006.01) |
| B01J 23/72 | (2006.01) |
| B01J 23/745 | (2006.01) |
| B01J 35/00 | (2006.01) |
| B01J 37/08 | (2006.01) |
| B01J 37/10 | (2006.01) |
| H01M 4/86 | (2006.01) |
| H01M 4/88 | (2006.01) |
| H01M 4/92 | (2006.01) |
| B01J 37/02 | (2006.01) |

(52) U.S. Cl.
CPC ............. *B01J 21/063* (2013.01); *B01J 21/18* (2013.01); *B01J 23/22* (2013.01); *B01J 23/30* (2013.01); *B01J 23/40* (2013.01); *B01J 23/48* (2013.01); *B01J 23/72* (2013.01); *B01J 23/745* (2013.01); *B01J 35/004* (2013.01); *B01J 35/006* (2013.01); *B01J 35/0013* (2013.01); *B01J 37/084* (2013.01); *B01J 37/105* (2013.01); *H01M 4/8631* (2013.01); *H01M 4/8673* (2013.01); *H01M 4/8817* (2013.01); *H01M 4/921* (2013.01); *B01J 37/0201* (2013.01); *Y02E 60/50* (2013.01)

(58) Field of Classification Search
None
See application file for complete search history.

(56) References Cited

U.S. PATENT DOCUMENTS

| 2003/0064265 A1* | 4/2003 | Hampden-Smith et al. ... 429/30 |
| 2005/0215068 A1 | 9/2005 | Yuka et al. |
| 2009/0272949 A1 | 11/2009 | Buttry |

OTHER PUBLICATIONS

Castilla et al.; Carbon Aerogels for Catalysis Applications; Carbon 43, pp. 455-465; 2005.*
Lin, "Development of Carbon-Metal Oxide Supercapacitors from Sol-Gel Derived Carbon-Ruthenium Xerogels", Jan. 1, 1999.
Castilla et al.;Group 6 Metal oxide-Carbon Aerogels. Their Synthesis, Characterization and Catalytic Activity in the Skeletal Isomerization of 1-Butene; Applied Catalysis A: General 183, pp. 345-356; 1999.
Castilla et al.; Carbon Aerogels for Catalsis Applications: An Overview; Carbon; 43, 455-465;2005.
Wu et al.; Synthesis and Photocatalytic Characterization of Titania-Supported Bamboo Charcoals by Using sol-Gel Method; Journal of Materials Processing Technology; 326-332; 2008.
Caruso et al.; Photocatalytic Properties of Porous Metal Oxide Networks Formed by Nanoparticale Infiltration in a Polymer Gel Template; J. Phys. Chem. B; 107, 952-957; 2003.

* cited by examiner

*Primary Examiner* — Guinever S Gregorio
(74) *Attorney, Agent, or Firm* — Edward E. Sowers; Brannon Sowers & Cracraft PC

(57) ABSTRACT

The present invention relates to a process for producing a carbon substrate loaded with metal oxides, in particular a carbon material which contains metal oxide nanoparticles and is preferably suitable for use in a catalyst and/or as a catalyst, wherein, in a first process step, nanoparticles of metal oxides are introduced into a matrix based on at least one organic polymer, in particular are dispersed therein, and, in a second process step, the polymer matrix containing the nanoparticles is subsequently carbonised to carbon, optionally followed by a third process step of activation.

11 Claims, No Drawings

PROCESS FOR PRODUCING CARBON SUBSTRATES LOADED WITH METAL OXIDES AND CARBON SUBSTRATES PRODUCED IN THIS WAY

CROSS-REFERENCES TO RELATED APPLICATIONS

"This is a divisional application that claims priority to and the benefit of co-pending U.S. patent application Ser. No. 13/054,609, filed on Jan. 18, 2011, which is a National Stage filing of International Application PCT/EP 2009/005182, filed Jul. 16, 2009, entitled "PROCESS FOR PRODUCING CARBON SUBSTRATES LOADED WITH METAL OXIDES AND CARBON SUBSTRATES PRODUCED IN THIS WAY" claiming priority to German Application No. DE 10 2008 033 574.6, filed Jul. 17, 2008. The subject application claims priority to co-pending application Ser. No. 13/054,609, to PCT/EP 2009/005182, and to German Application No. DE 10 2008 033 574.6, the disclosures of which are incorporated herein by reference.

BACKGROUND OF THE INVENTION

The present invention relates to the field of catalysis, in particular the field of catalyst materials.

In particular, the present invention relates to a process for producing carbon substrates loaded with metal oxides, in particular carbon materials containing metal oxide nanoparticles, which substrates are preferably suitable for use in and/or as catalysts or else in and/or as bipolar plates, and to the actual carbon substrates thus obtainable and the use thereof, particularly in and/or as catalysts or in and/or as bipolar plates.

There are a large number of chemical reactions that only occur in the presence of a catalyst or only result in significant yields of product in the presence of a catalyst.

Generally, the term 'catalysis' is understood to be the change or decrease in activation energy and thus the change in the reaction rate of a chemical reaction caused by the participation of a catalyst without changing the thermodynamic equilibrium.

The term 'catalyst' denotes a substance that reduces activation energy of the chemical reaction concerned and thus affects the reaction rate of this chemical reaction without being consumed or reacted itself. The catalyst emerges unchanged from the overall reaction and thus can perform a number of catalysis cycles.

Since more than 80% of all industrial chemical products come into contact with catalysts during their production, the value added by these is very high and of considerable economic importance. Catalysts are thus used in more than 80% of all known, industrial chemical processes; without the presence of catalysts the chemical reactions concerned would not take place or, at best, would take place a lot more slowly or incompletely.

'Heterogeneous catalysts' are used in a large number of catalysed chemical processes. Reference is made to heterogeneous catalysis if, during a chemical reaction, the catalyst on the one hand and the reacting substances or starting materials on the other are present in different states of matter. By far, the most frequently used state of matter of heterogeneous catalysts is the solid state. The catalyst consists either completely of the active component ('full catalysts') or the actual effective active component is applied to a support material, which is generally the case ('supported catalysts'). For example, a suitable substrate (for example carbon, such as active carbon, aluminium oxide, silicon oxide, etc.) can be loaded with the actual catalytically active component, in particular can be impregnated therewith or similar.

For example, supported catalysts based in metal oxides, such as titanium dioxide, vanadium pentoxide and tungsten oxide thus can be used in a versatile manner, for example in the selective catalytic reduction (also known synonymously as SCR) of nitrogen oxides in exhaust gases of firing systems, waste incinerator plants, gas turbines, industrial plants, engines, etc., nitrogen oxides being selectively reduced whilst undesired secondary reactions such as oxidation of sulphur dioxide to form sulphur trioxide are largely suppressed. For example, the aforementioned SCR process is applied in the automotive industry in order to reduce the pollutant emissions of diesel motor vehicles.

The above-mentioned titanium dioxide especially, preferably in crystalline form such as rutile and/or anatase, can be used as a heterogeneous catalyst, particularly in 'photocatalysis'. For example, $TiO_2$ nanoparticles are thus implemented for 'self-cleaning' surfaces, organic materials on the surfaces concerned being decomposed by irradiation of UV radiation, in such a way that these surfaces remain clean and antimicrobial.

However, the support catalysts known from the prior art pose a range of drawbacks: on the one hand the catalytically active component is often not present in sufficiently small particles so an optimal (specific) surface area is not always available for catalysis. Furthermore, it is often necessary to proceed with an excess of catalytically active component since, when loading the support material, some of the catalytically active component is not freely accessible for catalysis.

A further drawback of the support catalysts known from the prior art is, in particular, that the catalytically active component is not always sufficiently immobilised on the support, in particular, under the often extreme reaction conditions, the catalytically active component migrates on the support surface and thus there is no longer a uniform distribution over the entire support surface; this undesired migration of the catalytically active component is often intensified further by crystallisation enthalpy. The materials normally used as support materials (for example carbon, etc.) generally impart insufficient immobilisation of the catalytically active component as a result of their nonpolar nature. Electrical conductivity can thus also be negatively influenced under some circumstances.

Lastly, a further drawback of the support catalysts known from the prior art that should be mentioned is that they are not always sufficiently chemically and/or mechanically stable under the partly extreme catalysis conditions to be used for sufficiently long lifetimes.

BRIEF SUMMARY OF THE INVENTION

The object of the present invention is therefore to provide materials that are suitable for use in or as catalysts, and to provide a corresponding process for the production thereof, the drawbacks of the prior art mentioned above being avoided, at least in part, or else at least mitigated.

In order to solve the problem illustrated above, the present invention proposes a process as described herein. In accordance with a first aspect, the present invention thus relates to a process for producing a carbon substrate loaded with a metal oxides, in particular a carbon material containing a metal oxide nanoparticle, according to claim 1; the relevant sub-claims relate to further advantageous configurations of this aspect of the invention.

In accordance with a second aspect, the present invention relates to the materials or products obtainable by the process according to the invention, as described herein including further advantageous configurations of this aspect of the invention.

In accordance with a third aspect, the present invention relates to the use of the materials or products obtainable by the process according to the invention as a catalyst or in the production of catalysts as described herein.

In addition, in accordance with a fourth aspect, the present invention further relates to a catalyst as described herein.

In addition, in accordance with a fifth aspect, the present invention further relates to the use of the materials or products obtainable by the process according to the invention as bipolar plates or in the production of bipolar plates as described herein.

Lastly, in accordance with a sixth aspect, the present invention further relates to a bipolar plate as described herein.

DETAILED DESCRIPTION OF THE INVENTION

It goes without saying that, in order to avoid repetitions, the embodiments given hereinafter only with reference to one aspect according to the invention also apply accordingly to the other aspects of the invention, although this is not expressly mentioned or noted.

Similarly it goes without saying that, with regard to all (numerical) values and specified ranges given below, the person skilled in the art may deviate from the (numerical) values and ranges specified based on application or individual circumstance, without departing from the scope of the present invention.

In accordance with a first aspect, the present invention thus relates to a process for producing a carbon substrate loaded with metal oxides, in particular a carbon material containing metal oxide nanoparticles, which substrate is preferably suitable for use in a catalyst (for example as a catalyst support material) and/or as a catalyst, in a first process step nanoparticles of metal oxides being introduced into a matrix based on at least one organic polymer, in particular being dispersed therein, and, in a second process step, the polymer matrix containing the nanoparticles being subsequently carbonised to carbon, optionally followed by a third process step of activation. The resultant carbon material (i.e. the char or else the activate) can then optionally be provided or loaded, in a concluding process step, with at least one catalytically active, particularly metal component (preferably selected from at least one precious metal or semiprecious metal or a salt thereof, preferably from the group of platinum, palladium, copper, silver, gold, ruthenium, rhodium, iridium and/or osmium as well as combinations and salts thereof), in particular by impregnation; the carbon material according to the invention serves as a matrix and support material for the (semi-)precious-metal-based catalysts (i.e. the precious metals or semi-precious metals or salts thereof, as defined above), the polar metal oxides or metal oxide nanoparticles incorporated in the carbon material serving as 'anchor points' so to speak for the (semi-)precious metals since these metals bind preferably to these anchor points and less to the largely nonpolar carbon surface.

The above statement that the carbon substrate according to the invention loaded with metal oxides, in particular the carbon material containing metal oxide nanoparticles is suitable for use in a catalyst and/or as a catalyst means, in particular, that the carbon substrate according to the invention loaded with metal oxides can be used both as an actual catalyst or else alternatively also only as a constituent of a catalyst, in the latter case it being possible for the carbon substrate loaded with metal oxides to be either a catalytically active component and/or a support material for the catalyst. In accordance with a particularly advantageous embodiment, the carbon substrate according to the invention loaded with metal oxides is used as a support material for a catalyst, in this embodiment (as described above), the carbon material according to the invention (i.e. the char or else the activate) being provided or loaded with at least one catalytically active, particularly metal component (preferably selected from at least one precious metal or semi-precious metal or a salt thereof, preferably from the group of platinum, palladium, copper, silver, gold, ruthenium, rhodium, iridium and/or osmium as well as combinations and salts thereof), in particular possibly being impregnated therewith; in this instance the carbon material according to the invention, i.e. the matrix formed of carbon and metal oxides incorporated therein, serves as a support material for the (semi-)precious-metal-based catalysts (i.e. the precious metals or semi-precious metals or salts thereof, as defined above), as described above.

A large number of advantages are linked to the process according to the invention and to the materials or products produced thereby, only some of these advantages being presented below:

By incorporating the metal oxide nanoparticles in a porous, carbon-based matrix it is ensured, when using this material as a catalyst or when using this material for the production of catalysts, that the surfaces of the incorporated metal oxide nanoparticles are freely accessible for the catalytic processes and effective catalysis can thus take place.

As a result of the embedding provided in accordance with the invention of the metal oxide nanoparticles in the porous carbon matrix using the process according to the invention described above, the metal oxide nanoparticles are immobilised, i.e. the metal oxide nanoparticles cannot change their position in the carbon substrate, in particular they cannot migrate on the support material surface, in such a way that the drawbacks in this regard of catalyst materials of the prior art, for example such as those produced by conventional impregnation methods or the like, can be effectively avoided. At the same time excellent accessibility of the catalytically active components is ensured for the catalytic processes as a result of the porosity of the matrix.

Furthermore, a high specific surface area of metal oxides is provided by incorporating the metal oxides in the form of nanoparticles, which is highly advantageous with regard to carrying out catalytic processes using these materials.

Similarly, the carbon material according to the invention with the metal oxide nanoparticles incorporated therein may serve as an extremely chemically stable matrix or as a support material for (further) catalytically active components (preferably selected from at least one precious metal or semi-precious metal or a salt thereof, preferably from the group of platinum, palladium, copper, silver, gold, ruthenium, rhodium, iridium and/or osmium as well as combinations and salts thereof), preferably for nano-scale (semi-)precious metal catalysts in particular that can be introduced into the carbon materials according to the invention by impregnation or fixed thereto or left to bind: as described above, the polar metal oxides or metal oxide nanoparticles incorporated in the carbon material serve as polar anchor points for the (semi-)precious metal catalysts.

By fixing the metal oxide nanoparticles in the carbon matrix, in particular by in-situ polymerisation in the presence of the metal oxide nanoparticles, and by the subsequent carbonisation (also referred to synonymously as 'coking', 'pyrolysis', 'burn-off' or the like), a particularly mechanically stable system is provided on the one hand that, on the other, has a high specific surface area and also ensures good accessibility of the catalytically active metal oxide material or the (semi-)precious metal catalysts optionally fixed thereto or thereon.

The materials according to the invention also have excellent mechanical properties, which favours their use as or in catalysts.

The products obtainable according to the invention are thus adapted, for the aforementioned reasons, for the production of catalysts or catalyst materials (for example support materials for catalysts) of any type since, in addition to the required mechanical strengths, they also possess the appropriate surface area and accessibility for catalytic processes.

In accordance with the invention it has thus been possible, surprisingly, to provide materials having the aforementioned properties that effectively avoid or mitigate the drawbacks of the prior art described above. A preferably porous carbon substrate with metal oxide nanoparticles incorporated therein, particularly titanium dioxide nanoparticles ($TiO_2$ nanoparticles), silicon dioxide nanoparticles ($SiO_2$ nanoparticles), aluminium oxide nanoparticles ($Al_2O_3$ nanoparticles), tungsten oxide nanoparticles ($WO_3$ nanoparticles), vanadium oxide nanoparticles ($V_2O_5$ nanoparticles), iron oxide nanoparticles ($Fe_2O_3$ nanoparticles and/or $Fe_3O_4$ nanoparticles), etc., preferably $TiO_2$ nanoparticles is produced.

In particular, the metal oxide nanoparticles used are particles with a mean particle size (D50), in particular with a mean crystallite size (D50), in the range from 0.1 to 1,000 nm, in particular 0.5 to 500 nm, preferably 1 to 250 nm, more preferably 2 to 100 nm, most preferably 5 to 75 nm.

For example, the mean particle sizes or crystallite sizes can be determined from histograms of transmission electron microscopy images or from X-ray diffractograms or else optionally on the basis of BET surface area.

For example, preferably crystalline metal oxide nanoparticles (for example $TiO_2$, $SiO_2$, $Al_2O_3$, $WO_3$, $V_2O_5$, $Fe_2O_3$, $Fe_3O_4$, etc.) produced by gas phase synthesis, such as flame synthesis, microwave plasma synthesis or the like typically can be used for the purposes according to the invention. Suitable, particularly crystalline metal oxide nanoparticles can be obtained, for example, in a flame reactor on the basis of suitable starting compounds. This is known to the person skilled in the art per se, so it is not necessary to go into further detail here in this regard.

The metal oxide nanoparticles to be used in accordance with the invention are normally advantageously crystalline; this is particularly advantageous in view of the use for catalytic purposes. In particular, the degree of crystallinity of the metal oxide nanoparticles used is at least 70%, in particular at least 80%, preferably at least 90%, and more preferably at least 95%. Completely crystalline metal oxide nanoparticles are most preferably used.

The metal oxide nanoparticles may be selected from nanoparticles of catalytically active and/or chemically and/or thermally stable metal oxides (for example $TiO_2$, $SiO_2$, $Al_2O_3$, $WO_3$, $V_2O_5$, $Fe_2O_3$, $Fe_3O_4$, etc.). Nanoparticles of metal oxides of the transition metals in the Periodic Table of the Elements and mixtures and alloys thereof are preferred. Nanoparticles of metal oxides from the group of titanium dioxide ($TiO_2$), silicon dioxide ($SiO_2$), aluminium oxide ($Al_2O_3$), tungsten oxide ($WO_3$), vanadium oxide ($V_2O_5$) and/or iron oxides ($Fe_2O_3$ and/or $Fe_3O_4$) are most preferred.

In accordance with a preferred embodiment according to the invention titanium dioxide nanoparticles ($TiO_2$ nanoparticles), silicon dioxide nanoparticles ($SiO_2$ nanoparticles), aluminium oxide nanoparticles ($Al_2O_3$ nanoparticles), tungsten oxide nanoparticles ($WO_3$ nanoparticles), vanadium oxide nanoparticles ($V_2O_5$ nanoparticles) and/or iron oxide nanoparticles ($Fe_2O_3$ nanoparticles and/or $Fe_3O_4$ nanoparticles), preferably $TiO_2$ nanoparticles are used as metal oxide nanoparticles, preferably in crystalline form.

In accordance with a particularly preferred embodiment according to the invention titanium dioxide nanoparticles are used as metal oxide nanoparticles, preferably in crystalline form, particularly in the form of rutile and/or anatase.

In order to ensure effective catalysis it is advantageous for the metal oxide particles used to have sufficient specific surface areas. In accordance with the invention suitable metal oxide nanoparticles normally have a BET surface area of 1 to 2,000 $m^2/g$, in particular 2 to 1,500 $m^2/g$, preferably 5 to 1,000 $m^2/g$, more preferably 10 to 500 $m^2/g$. All BET values quoted or calculated within the scope of the present invention are determined in accordance with ISO 9277 (1995), which replaces DIN 66131.

The amounts of metal oxide nanoparticles used may vary widely.

Within the scope of the process according to the invention the metal oxide nanoparticles are normally used in such amounts that the volume-based content of metal oxide(s) and/or metal oxide nanoparticles in the carbon substrate is at most 20 percent by volume, in particular at most 15 percent by volume, preferably at most 10 percent by volume, and more preferably at most 6 percent by volume based on the carbon substrate. These values are particularly construed in such a way that contact between the nanoparticles (i.e. particle/particle contact) in the carbon substrate should be avoided, at least where possible.

Generally, the metal oxide nanoparticles are used in such amounts that the volume-based content of metal oxide(s) or metal oxide nanoparticles in the carbon substrate is 0.01 to 20 percent by volume, in particular 0.1 to 15 percent by volume, preferably 0.5 to 10 percent by volume, and more preferably 0.5 to 6 percent by volume based on the carbon substrate.

The weight-based amount of metal oxide nanoparticles used may also vary widely. The metal oxide nanoparticles are normally used in such amounts that the mass-based content of metal oxide(s) or metal oxide nanoparticles in the carbon substrate is 0.1 to 25 percent by weight, in particular 0.2 to 20 percent by weight, and preferably 0.5 to 15 percent by weight based on the carbon substrate.

The aforementioned lower limits are imposed, in particular, by the fact that any effect whatsoever must be achieved for effective application as a catalyst material, whereas the upper limits are based on the one hand on the desire to avoid particle contact and, on the other, are established by the specific amounts above which it is no longer possible to achieve a significant increase in catalytic efficacy.

Before introduction into the organic polymer, particularly before dispersion in the organic polymer, the metal oxide nanoparticles are advantageously subjected to a surface modification or surface functionalisation, preferably waterproofing. In particular, the surface modification or surface functionalisation may be carried out by alkylsilyl group functionalisation, preferably by methylsilyl group functionalisation (for example trimethylsilyl group functionalisation). The functionalisation of the particle surface of the metal oxide nanoparticles is advantageous, in particular for the purposes of waterproofing, in order to disperse the metal oxide nanoparticles in the polymers or relevant starting monomers, in particular homogeneously. In particular, reactive silanes can be used for functionalisation; chlorosilanes and hexamethyldisilazane are more preferably used, more preferably chlorosilanes of the general formula $SiCl_xR_{4-x}$ where x=1 to 3, the radical R being an organic radical, preferably an alkyl radical, preferably with the general formula $C_nH_{(2n+1)}$, more preferably where n=1 to 6.

In accordance with a particularly preferred embodiment the organic polymer is produced in situ in the presence of the metal oxide nanoparticles. For this purpose, the preferably previously surface-modified or surface-functionalised, particularly waterproofed metal oxide nanoparticles are dispersed in the corresponding organic monomers or solutions or dispersions thereof, and the organic monomers are then polymerised to the relevant organic polymers in the presence of the metal oxide nanoparticles. An organic polymer matrix is produced, in which the metal oxide nanoparticles are incorporated or embedded, preferably with homogeneous or uniform distribution, this polymer matrix then being subsequently carbonised or pyrolysed and optionally finally activated, as described hereinafter in greater detail.

In the particular embodiment illustrated above, in accordance with which organic monomers are used that are subsequently polymerised in situ in the presence of the metal oxide nanoparticles, monomers that contain no chemically bonded oxygen are used in particular; in accordance with the invention preferred organic monomers are particularly selected from the group of vinyl chloride, styrene, tetrafluoroethylene, ethylene and/or polypropylene, preferably styrene, more preferably styrene together with divinylbenzene (in the latter case divinylbenzene-crosslinked polystyrene is produced after polymerisation, as described hereinafter).

Within the scope of the process according to the invention, organic polymers that contain no chemically bonded oxygen are advantageously used as organic polymers that form the matrix for the metal oxide nanoparticles to be incorporated therein. Preferably, in accordance with the invention the organic polymers that form the matrix for the metal oxide nanoparticles incorporated therein are selected from the group of polyvinyl chloride, polyacrylonitrile, polystyrene, polytetrafluoroethylene, polyethylene and/or polypropylene, preferably polystyrene. Divinylbenzene-crosslinked polystyrene is more preferred, in particular with a divinylbenzene content of 0.1 to 20 percent by weight, preferably 1 to 10 percent by weight based on organic polymer.

In accordance with the invention it is preferred for the organic monomers and/or the organic polymers to be present in sulphonated form or to comprise sulphonic acid groups. The sulphonic acid groups are normally only introduced after production of the polymer or before the process step of carbonisation, more specifically by sulphonation in a manner known per se. In the subsequent carbonisation, sulphonic acid groups form free radicals that lead to the crosslinkings within the scope of the pyrolysis process responsible for the good yields of carbon. In principle, other chemically suitable groups can also be used instead of sulphonic acid groups, for example isocyanate groups.

The metal oxide nanoparticles can be incorporated or dispersed in the organic monomers or polymers by measures known per se to the person skilled in the art, for example by stirring, kneading, grinding using ball mills, ultrasound treatment, extrusion, etc.

In accordance with a specific embodiment of the present invention, the polymers containing the metal oxide nanoparticles can be shaped before the process step of carbonisation. For example, the polymers containing the metal oxide nanoparticles can be processed to form moulded parts, such as balls, discs, blocks, more complex structures or the like that are subsequently carbonised or pyrolysed and finally optionally activated in such a way that carbon species with a large specific surface area (BET) with metal oxide nanoparticles embedded herein are produced, as illustrated below.

With regard to the process step of carbonisation, which is also referred to synonymously as 'pyrolysis', 'burn-off' or the like, the polymeric starting material is converted into carbon within the scope of this process step, i.e. in other words the polymeric carbon-containing starting material is carbonised. During carbonisation of the aforementioned polymers, which contain functional chemical groups and, during the thermal decomposition thereof, lead to free radicals and thus to crosslinkings, in particular sulphonic acid groups, the functional chemical groups, in particular sulphonic acid groups, are destroyed with the cleaving of volatile constituents, such as $SO_2$ in particular, and free radicals are formed that effect a high level of crosslinking, without which there would be no significant pyrolysis residue (=carbon).

Carbonisation is generally preferably carried out under at least substantially inert conditions, in particular with the exclusion of oxygen, preferably under an inert atmosphere. Excessive burn-off is thus prevented.

Carbonisation is normally carried out at temperatures in the range from 300 to 1,500° C., in particular 600 to 1,200° C., preferably 700 to 1,000° C., durations from 0.1 to 20 hours, preferably 0.5 to 10 hours, more preferably 1 to 5 hours being normal in particular.

In accordance with the invention an activation step may preferably follow carbonisation and is ultimately carried out in order to form active carbon in the matrix and in order to form active centres in the matrix.

The basic principle of activation consists in selectively and targetedly decomposing, under suitable conditions, some of the carbon generated during carbonisation. Numerous pores, cracks and fissures are thus formed and the surface area based on the unit of mass increases considerably. During activation the carbon is thus burned off selectively, in particular in order to release further metal oxide surface. Since carbon is decomposed during activation, there is a specific loss of substance during this process that, under optimal conditions, is equivalent to an increase in porosity and a rise in inner surface and pore volume. Activation thus normally occurs under selective or controlled oxidising conditions. Normal activation gases are generally oxygen, particularly in the form of air, steam and/or carbon dioxide as well as mixtures of these activation gases. Since there is a risk with oxygen that the surface will be affected not only selectively, but entirely, the carbon being burnt off more or less intensely, steam and carbon dioxide are preferred, optionally mixed with an inert gas (for example nitrogen).

Within the scope of the present invention, activation is normally carried out under oxidising conditions, particularly in the presence of an oxygen-atom-containing gas, preferably selected from oxygen, particularly in the form of air, carbon dioxide and/or steam, preferably carbon dioxide and/or steam, optionally with the addition of at least one inert gas (for example nitrogen, etc.).

Activation is generally carried out at temperatures in the range from 500 to 2,000° C., in particular 600 to 1,500° C., preferably 700 to 1,200° C., durations of 0.1 to 20 hours, preferably 0.5 to 10 hours, more preferably 1 to 5 hours being normal.

Within the scope of the process according to the invention, a catalytically active material or catalyst support material with preferably crystalline metal oxide nanoparticles in a preferably porous carbon matrix (i.e. active carbon matrix if the concluding activation step is carried out) is produced. As a result of using nanoparticles, catalytically large surface areas or polar anchor points are provided that, as a result of the porosity of the matrix material, are also freely accessible for the processes to be catalysed or for the binding of or impregnation with catalytically active materials such as (semi-)precious metals, as described above. Moreover, the materials according to the invention have excellent mechanical stability, which favours their use in or as catalyst materials.

Within the scope of the process according to the invention, the metal oxide nanoparticles are fixed on the support surface effectively and durably in such a way that migration of the nanoparticles during catalysis is effectively avoided (in contrast to the catalyst materials known from the prior art, which for example relate to supported catalyst systems produced using impregnation methods). Undesired particle contact during migration with a resultant reduction in the accessible surface area is thus also prevented.

The materials according to the invention are also completely stable from a chemical point of view so they are also adapted for catalysis under extreme conditions (for example high temperatures, aggressive ambient conditions, such as acidic or alkaline media, etc.).

Owing to the use of nanoparticles of extremely small particle size, the electrical conductivity of the carbon matric also remains unaffected, or else is not affected significantly.

In accordance with a second aspect, the present invention relates to the carbon substrates loaded with metal oxides and obtainable by the process according to the invention, in particular the carbon materials containing metal oxide nanoparticles and obtainable by the process according to the invention.

In other words, in accordance with this aspect of the invention the present invention relates to carbon substrates loaded with metal oxides, in particular carbon materials containing metal oxide nanoparticles that are preferably adapted for use in and/or as catalysts, the carbon substrates according to the invention comprising or containing nanoparticles of metal oxides incorporated in a preferably porous carbon matrix.

For further details regarding this aspect of the invention, reference can be made to the aforementioned embodiments concerning the process according to the invention, these embodiments applying accordingly to the carbon substrate according to the invention.

As already mentioned, the carbon materials according to the invention are distinguished by high porosity, which enables trouble-free catalysis with the use of these materials since the metal oxide nanoparticles are easily accessible as a result of the porosity.

In particular, the carbon substrates according to the invention are distinguished by a porosity, determined as the total pore volume in accordance with Gurvich, in the range from 0.01 to 4 m$^3$/g, in particular 0.1 to 3.5 m$^3$/g, preferably 0.2 to 3 m$^3$/g, more preferably 0.3 to 2.0 m$^3$/g.

It is particularly advantageous for the carbon substrate according to the invention to have such a porosity that at least 10 percent by volume, in particular at least 15 percent by volume, and preferably at least 20 percent by volume of the total volume of the carbon substrate is formed by pores or is porous. Ideally, 10 to 80 percent by volume, in particular 15 to 75 percent by volume, and preferably 20 to 60 percent by volume of the total volume of the carbon substrate is formed by pores.

Furthermore, the carbon substrates according to the invention are distinguished by a high inner surface area (BET). In particular, the carbon materials according to the invention have a BET surface area of 100 to 2,000 m$^2$/g, in particular 200 to 1,750 m$^2$/g, and preferably 300 to 1,500 m$^2$/g.

As illustrated above, the content of metal oxide(s) or metal oxide nanoparticles in the carbon substrates according to the invention may vary widely.

The volume-based content of metal oxide(s) or metal oxide nanoparticles in the carbon substrate according to the invention can thus vary in the range from 0.01 to 20 percent by volume, in particular 0.1 to 15 percent by volume, preferably 0.5 to 10 percent by volume, and more preferably 0.5 to 6 percent by volume based on the carbon substrate.

The volume-based content of metal oxide(s) and/or metal oxide nanoparticles in the carbon substrate should advantageously be at most 20 percent by volume, in particular at most 15 percent by volume, preferably at most 10 percent by volume, and more preferably at most 6 percent by volume based on the carbon substrate.

Furthermore, the mass-based content of metal oxide(s) and/or metal oxide nanoparticles in the carbon substrate may vary in the range from 0.1 to 25 percent by weight, in particular 0.2 to 20 percent by weight, and preferably 0.5 to 15 percent by weight based on the carbon substrate.

The aforementioned lower limits are imposed by the fact that a specific minimum amount of metal oxide nanoparticles must be present in order to achieve a catalytic effect, whereas the aforementioned upper limits are imposed by the fact that contact between the nanoparticles in the carbon matrix should be avoided where possible and that there is also no longer a significant increase in catalytic efficacy.

As described above, in accordance with a specific embodiment the carbon substrate according to the invention can be provided and/or loaded with at least one catalytically active, particularly metal component, in particular by impregnation; in particular the catalytically active component may be selected from at least one precious metal or semi-precious metal or a salt thereof, preferably from the group of platinum, palladium, copper, silver, gold, ruthenium, rhodium, iridium and/or osmium as well as combinations and respective salts thereof.

In accordance with a third aspect, the invention further relates to the use of the carbon substrate according to the invention as a catalyst and/or in the production of catalysts (for example as a catalyst support material).

The carbon substrates according to the invention are adapted for catalytic processes of any type, for example for the treatment of all types of exhaust gas (for example exhaust gases or flue gases from power stations, exhaust gases from internal combustion engines, such as cars or the like).

The catalysts concerned may also be used in fuel cells.

Especially in the case of use of $TiO_2$ nanoparticles, the carbon substrate according to the invention can be used as a catalyst or for the production of catalysts for photocatalysis or for photocatalytic processes.

As described above, in addition to the use as an actual catalyst, the use of the carbon substrate according to the invention also as merely a constituent of a catalyst is also considered, the carbon substrate according to the invention loaded with metal oxides possibly being either a catalytically active component or else a support material for the catalyst. In particular, the carbon substrate according to the invention loaded with metal oxides can be used as a support material for a catalyst, in this embodiment (as described above) the carbon material according to the invention possibly being provided or loaded with at least one catalytically active, particularly metal component (preferably selected from at least one precious metal or semi-precious metal or a salt thereof, preferably from the group of platinum, palladium, copper, silver, gold, ruthenium, rhodium, iridium and/or osmium as well as combinations and salts thereof), in particular possibly being impregnated therewith.

In accordance with a fourth aspect, the present invention further relates, in turn, to a catalyst that contains the above-described carbon substrate according to the present invention, or is produced using the above-described carbon substrate according to the present invention.

In accordance with a specific embodiment, the carbon substrate may be provided and/or loaded with at least one catalytically active, particularly metal component, in particular by impregnation. In particular, the catalytically active component can be selected from at least one precious metal or semi-precious metal or a salt thereof, preferably from the group of platinum, palladium, copper, silver, gold, ruthenium, rhodium, iridium and/or osmium as well as combinations and respective salts thereof.

For further details regarding this aspect of the invention, reference can be made to the embodiments concerning the third aspect of the invention, these embodiments applying accordingly in this regard.

In accordance with a fifth aspect, the present invention further relates to the use of the carbon substrate according to the invention as a bipolar plate and/or in the production of bipolar plates.

In accordance with a sixth embodiment, the present invention further relates to a bipolar plate that contains the above-described carbon substrate according to the present invention, or is produced using the above-described carbon substrate according to the present invention.

For further details regarding the other aspects of the present invention, reference can be made to the aforementioned embodiments concerning the first aspect of the invention and vice versa in order to avoid unnecessary repetitions, these embodiments applying accordingly to the other aspects of the invention.

The person skilled in the art will be readily able to recognise and implement further configurations, modifications and variations of the present invention upon reading the description, without departing from the scope of the present invention.

The following practical example merely illustrates the present invention, which is not limited thereto.

Practical Example:
Production of Carbon Materials According to the Invention with Titanium Dioxide Nanoparticles or Other Metal Oxide Nanoparticles Incorporated Therein 20 g of $TiO_2$ powder with a specific surface area of 100 $m^2/g$ were dispersed in a mixture of 200 ml of toluene and 20 ml of pyridine in a round-bottomed flask with vigorous stirring and with the aid of an ultrasound generator and slowly reacted with a mixture of 200 ml of toluene and 100 ml of chlorotrimethylsilane. The suspension was stirred for 1 hour with nitrogen rinsing and the excess organic constituents were distilled of under vacuum. 10 g of the thus functionalised titanium dioxide powder were dispersed in 100 ml of styrene with the aid of an ultrasound generator, and 5 g of divinylbenzene and 5 g of dibenzoyl peroxide were added to the dispersion. The suspension was heated with stirring in a boiling water bath for 40 minutes, poured into a mould and cooled. 100 g of the resultant solid were then size-reduced and reacted in a round-bottomed flask with 200 ml of concentrated sulphuric acid. The suspension was heated to 160° C. with vigorous stirring for 30 minutes, cooled and filtered. The filter residue was introduced into a rotary kiln and pyrolysed under nitrogen for 3 hours at 750° C. Next, 30 percent by volume of steam was added to the nitrogen gas flow and the powder was activated for a further 60 minutes at 800° C. A carbon material according to the invention with titanium dioxide nanoparticles incorporated therein is obtained that is suitable is a catalyst material (for example for photocatalysis) or else as a support material for catalysts. If the carbon material according to the invention thus produced is to be used as a support material for a catalyst, an impregnation treatment with a suitable (semi-) precious metal (for example based on Pt, Cu, Ag, Rh, etc.) or a salt thereof may then follow.

In a similar approach, other metal oxide nanoparticles are also incorporated (for example $SiO_2$, $WO_3$, $V_2O_5$, $Fe_2O_3$, $Fe_3O_4$, etc.).

The invention claimed is:

1. A carbon substrate loaded with metal oxides on the basis of a carbon material comprising metal oxide nanoparticles,
    wherein the carbon substrate contains immobilized nanoparticles of metal oxides incorporated in a porous carbon matrix and wherein the carbon substrate is obtained by a process, wherein the process comprises the following process steps:
    (i) in a first process step, nanoparticles of metal oxides are introduced or dispersed into a matrix based on at least one organic polymer,
    (ii) then, in a second process step, the polymer matrix containing the nanoparticles is subsequently carbonized to carbon,
    (iii) optionally followed by a third process step of activation,
    wherein the first process step involves providing a dispersion of surface-modified or surface functionalized metal oxide nanoparticles in respective organic monomers or solutions or dispersions thereof, and polymerizing the resulting dispersion containing surface-modified or surface functionalized metal oxide nanoparticles and the organic monomers.

2. The carbon substrate according to claim 1,
    wherein the carbon substrate has a porosity, determined as the total pore volume in accordance with Gurvich, in the range from 0.01 to 4 $cm^3/g$.

3. The carbon substrate according to claim 1,
    wherein 10 to 80 percent by volume of the total volume of the carbon substrate is formed by pores.

4. The carbon substrate according to claim 1,
    wherein the carbon substrate has a BET surface area in the range from 100 to 2,000 $m^2/g$ and a volume-based content of metal oxide(s).

5. The carbon substrate according to claim 1,
    wherein the carbon substrate has a volume-based content of metal oxide(s) and/or metal oxide nanoparticles in the carbon substrate in the range from 0.01 to 20 percent by volume based on the carbon substrate and wherein the carbon substrate has a mass-based content of metal oxide(s) and/or metal oxide nanoparticles in the carbon substrate in the range from 0.1 to 25 percent by weight based on the carbon substrate.

6. The carbon substrate according to claim 1, wherein the metal oxide nanoparticles have a mean particle size in the range from 0.1 to 1,000 nm.

7. The carbon substrate according to claim 1, wherein the metal oxide nanoparticles are crystalline having a crystallinity of at least 70% and wherein the metal oxide nanoparticles have a BET surface area in the range from 1 to 2,000 $m^2/g$.

8. The carbon substrate according to claim 1, wherein the metal oxide nanoparticles are selected from nanoparticles of catalytically active metal oxides comprising metal oxides from the group consisting of titanium dioxide, silicon dioxide, aluminum oxide, tungsten oxide, vanadium oxide and iron oxides as well as mixture and alloys thereof.

9. The carbon substrate according to claim 1, wherein the carbon substrate exhibits catalytic activity.

10. The carbon substrate according to claim 1, configured in the form of a bipolar plate.

11. A carbon substrate loaded with metal oxides on the basis of a carbon material comprising metal oxide nanoparticles,
wherein the carbon substrate contains immobilized nanoparticles of metal oxides incorporated in a porous carbon matrix and
wherein the carbon substrate is obtained by a process, wherein the process comprises the following process steps:
(i) in a first process step, nanoparticles of metal oxides are introduced or dispersed into a matrix based on at least one organic polymer, wherein the metal oxide nanoparticles are crystalline having a crystallinity of at least 70% and wherein the metal oxide nanoparticles have a BET surface area in the range from 1 to 2,000 $m^2/g$,
(ii) then, in a second process step, the polymer matrix containing the nanoparticles is subsequently carbonized to carbon,
(iii) optionally followed by a third process step of activation,
wherein the first process step involves providing a dispersion of previously surface-modified or surface functionalized metal oxide nanoparticles in respective organic monomers or solutions or dispersions thereof, and polymerizing the resulting dispersion containing surface-modified or surface functionalized metal oxide nanoparticles and the organic monomers.

* * * * *